United States Patent
Bruchmann et al.

(10) Patent No.: US 6,376,637 B1
(45) Date of Patent: Apr. 23, 2002

(54) DENDRITIC AND HIGHLY BRANCHED POLYURETHANES

(75) Inventors: Bernd Bruchmann, Freinsheim; Ulrike Ehe, Lambsheim; Frank Wingerter, Ludwigshafen; Konrad Stiefenhöfer, Ebertsheim; Ulrich Treuling, Bensheim, all of (DE)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/491,852

(22) Filed: Jan. 26, 2000

(30) Foreign Application Priority Data

Feb. 4, 1999 (DE) .......................................... 199 04 444

(51) Int. Cl.⁷ .............................................. C08G 18/10
(52) U.S. Cl. .......................................... 528/60; 525/457
(58) Field of Search ............................. 528/60; 525/457

(56) References Cited

U.S. PATENT DOCUMENTS 5,981,684 A    11/1999   Bruchmann et al. .......... 528/45

FOREIGN PATENT DOCUMENTS

WO    WO 97/02304    1/1997

OTHER PUBLICATIONS

Polyurethane Dendrimer Via Curtis Reaction; Richard T. Taylor and Uraiwan Puapaiboon; Tetrahedron Letters 39 (1998) 8005–8008.

Two–Step Aproach Towards the Accelerated Synthesis of Dendritic Macromolecules; Ralph Spindler and Jean Frechet; J.Chem. Soc. Perkin Trans. 1993; pp. 913–918.

Synthesis and Characterization of Hyperbranched Polyurethanes Prepared from Blocked Isocyanate Monomers by Step–Growth Polymerization; Ralph Spindler and Jean Frechet; Macromolecules 1993, 26, 4809–4813.

Hyperbranced Polymers: A Review; Olabisi, Atiqullah, and Keminsky; J.M.S.–Rev. Macromol. Chem. Phys.,; pp. 554–579, 1997.

A Novel One–Pot Synthesis of Hyperbranched Polyurethanes; Anil Kumar and S. Ramakrishnan; J. Chem Soc. Chem. Comm. 1993; pp. 1453–1454.

*Primary Examiner*—Rachel Gorr
(74) *Attorney, Agent, or Firm*—Fernando A. Borrego; Mark K. Cameron

(57) ABSTRACT

In a process for preparing dendritic or highly branched polyurethanes by reacting diisocyanates and/or polyisocyanates with compounds containing at least two groups which are reactive toward isocyanates, at least one of the reactants contains functional groups having a different reactivity compared to the other reactant and the reaction conditions are selected so that only certain reactive groups react with one another in each reaction step.

7 Claims, No Drawings

DENDRITIC AND HIGHLY BRANCHED POLYURETHANES

The present invention relates to dendritic and highly branched polyurethanes, to a process for preparing them and to their use.

Dendrimers, arboroles, starburst polymers and hyperbranched polymers are terms for polymeric structures which have a branched structure and a high functionality. These structures have been described in different variants for many classes of polymeric compounds, for example for polyamines, polyamides, polyethers, polyesters, polyphenylenes and polysiloxanes. A comprehensive review of this field is given, for example, in E. Malmström and A. Hult, J.M.S. -Rev. Macromol. Chem. Phys., 1997, C 37(3), 555–579 and in Dendritic Molecules, R. Newkome, C. N. Moorefield and F. Vögtle, Verlag Chemie, Weinheim 1996.

Dendritic and highly branched polyurethanes are accorded only little importance in the literature at present. The preparation of such compounds is described, for example, in R. Spindler and J. M. J. Frechet, Macromolecules 1992, 4809–4813. In the process described there, highly branched polyurethanes are prepared by an intermolecular polyaddition reaction of monomers of the formula (I)

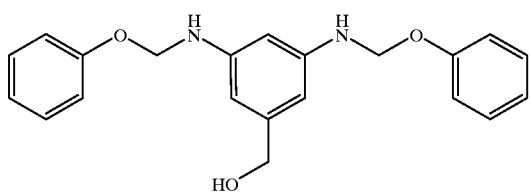

(I)

This monomer, which may be regarded as phenol-capped 3,5-diisocyanatobenzyl alcohol, is prepared from 3,5-dinitrobenzyl alcohol in a four-stage reaction by means of various protective group techniques. On heating, phenol is eliminated and the polyaddition of the monomers (I) onto one another commences. Disadvantages of this process are that the monomer (I) is not commercially available and the preparation of the highly branched polyurethanes described in thus very expensive and that the required elimination of phenol is associated with toxicological and occupational hygiene problems.

A. Kumar and S. Ramakrishnan, J. Chem. Soc., Chem. Commun. 1993, 1453, describe the preparation of highly branched polyurethanes by a single-vessel synthesis. Here, a dihydroxybenzoyl azide is first generated and this polymerizes intermolecularly under the action of heat with elimination of nitrogen. The monomer described in this process is also not commercially available and the phenyl urethanes are thermally unstable, which restricts the possible use of the products. In addition, azides are difficult to prepare and to handle.

R. Spindler and J. M. J. Frechet, J. Chem. Soc., Perkin Trans. I, 1993, 913, describe a synthesis of structurally uniform polyurethanes in which dendrite branches are built up from a diisocyanatobenzyl chloride and a protected 3,5-dihydroxybenzyl alcohol and are coupled to a polyfunctional alcohol as center. Here too, the monomers described are not commercially available and the preparation of the dendrimers is thus expensive.

R. T. Taylor and U. Puapaiboon, Tetrahedron Lett. 39(1998)8005, describe a dendrimer synthesis via a Curtius reaction. Here, dendritic urethane branches are first generated from aromatic phenoldicarboxylic acids by treatment with alcohol and diphenylphosphoryl azide using protective group techniques and these are then coupled convergently to a triurethane derived from benzenetricarboxylic acid. The disadvantages of this process are the same as those mentioned above.

WO 97/02304 describes a process for preparing dendritic and highly branched polyurethanes in which compounds customary in polyurethane chemistry are used as starting materials. Isocyanate components used are, for example, diphenylmethane diisocyanate (MDI), tolylene diisocyanate (TDI), p-phenylene diisocyanate, hexamethylene diisocyanate (HDI) or isophorone diisocyanate (IPDI). As polyol component, use is made, for example, of glycerol, trimethylolpropane (TMP) or pentaerythritol. To prepare the dendrimers, monomers which have one NCO group and two protected OH groups are produced in a first reaction step. Addition of these monomers onto an OH or NH containing initiator molecule and removal of the protection on the OH groups gives polyurethane polyols which grow into dendritic structures by divergent (shell-like) buildup. Modification of this reaction scheme also enables the dendrimers to be prepared by the convergent method, i.e. generation of the dendrite branches and subsequent coupling to a center. Highly branched polyurethanes can also be prepared from the monomers mentioned by means of an intermolecular reaction. The important disadvantage of this process is the use of protective group chemistry. The introduction and removal of the protective groups makes this process cumbersome and expensive.

It is an object of the invention to develop a simple process for preparing dendritic and highly branched polyurethanes which can be carried out using readily available raw materials and which, in particular, can be carried out without the incorporation of protective groups.

We have found that this object is achieved by exploiting the differences in the reactivity of the isocyanate groups of diisocyanates or polyisocyanates or of the functional groups in the compounds which are reactive toward isocyanates in order to control a selective buildup of the polymers.

The present invention accordingly provides a process for preparing dendritic or highly branched polyurethanes by reacting diisocyanates and/or polyisocyanates with compounds containing at least two groups which are reactive toward isocyanates, wherein at least one of the reactants contains functional groups having a different reactivity compared to the other reactant and the reaction conditions are selected so that only certain reactive groups react with one another in each reaction step.

Usually, the in each case most reactive groups of the monomers react with one another or the most reactive groups of the monomers react with the end groups of the dendrimers.

The invention also provides the dendritic and highly branched polyurethanes prepared by this process.

For the purposes of the present invention, dendritic polyurethanes are macromolecules which contain urethane groups, are structurally and molecularly uniform and have branched molecular chains going out from a central molecule. For the purposes of the present invention, the branched molecular chains themselves are also included under the term dendritic polyurethanes.

For the purposes of the present invention, highly branched polyurethanes are uncrosslinked macromolecules which contain urethane groups and are both structurally and molecularly nonuniform. They can, on the one hand, be built up going out from a central molecule in a manner similar to dendrimers, but with a nonuniform chain length of the branches. On the other hand, they can also be built up linearly with functional side groups or else, as a combination of these two extremes, have linear and branched parts of the molecule.

Preferred diisocyanates and/or polyisocyanates having NCO groups of differing reactivity are, for example, aromatic isocyanates such as tolylene 2,4-diisocyanate (2,4-TDI), diphenylmethane 2,4'-diisocyanate (2,4'-MDI), triisocyanatotoluene, or aliphatic isocyanates such as isophorone diisocyanate (IPDI), 2-butyl-2-ethylpentamethylene diisocyanate, 2-isocyanatopropylcyclohexyl isocyanate, dicyclohexylmethane 2,4'-diisocyanate and 4-methylcyclohexane 1,3-diisocyanate (H-TDI).

Preference is also given to isocyanates whose NCO groups initially have the same reactivity but in which a first addition of an alcohol or amine onto an NCO group enables a decrease in the reactivity of the second NCO group to be induced. Examples are isocyanates whose NCO groups are coupled via an electronic system, e.g. 1,3- and 1,4-phenylene diisocyanate, naphthylene 1,5-diisocyanate, biphenyl diisocyanate, tolidine diisocyanate and tolylene 2,6-diisocyanate.

It is naturally also possible to use mixtures of the abovementioned isocyanates.

As compounds having at least two groups which are reactive with isocyanates, preference is given to using bifunctional, trifunctional or tetrafunctional compounds whose functional groups have differing reactivities toward NCO groups. Preferred compounds have at least one primary and at least one secondary hydroxyl group, at least one hydroxyl group and at least one ercapto group, particularly preferably those having at least one hydroxyl group and at least one amino group in the molecule, in particular aminoalcohols, amino diols and amino triols, since the reactivity of the amino group in the reaction with isocyanate is significantly higher than that of the hydroxyl group.

Examples of said compounds having at least two groups which are reactive toward isocyanates are propylene glycol, glycerol, ercaptoethanol, ethanolamine, N-methylethanolamine, diethanolamine, ethanolpropanolamine, dipropanolamine, diisopropanolamine, 2-aminopropane-1,3-diol, 2-amino-2-methylpropane-1,3-diol and tris(hydroxymethyl) aminomethane.

Furthermore, mixtures of the compounds mentioned can also be used.

To obtain precisely defined structures in the preparation of the dendritic polyurethanes, it is necessary in each case to add at least that amount of monomers which allows each free functional group of the polymer to react. At the beginning of the reaction, it is usual for the reactor to be charged with a polyfunctional molecule, referred to as the initiator molecule or initiator center, onto each of whose functional groups a molecule which is reactive toward this functional group is added. This is followed, if necessary, by removal of the unreacted monomers and purification of the intermediate. Subsequently, a polyfunctional monomer is again added onto each free functional group of the intermediate, followed, if necessary, by removal of the excess monomers and purification, and so forth until the desired molecular weight has been reached or addition of further monomers is no longer possible for stearic reasons. The individual intermediates are also referred to as generations, where the intermediate formed by addition of monomers onto the initiator molecule is referred to as the zeroth generation, the next intermediate is referred to as the first generation, and so forth. The differing reactivity of the functional groups of the monomers used ensures that the most reactive functional groups in each case react with the end groups of the dendrite chains and the less reactive functional groups of the monomers form the functional end groups of the next generation of the dendritic polyurethanes.

In a preferred embodiment of the invention, the preparation of the dendritic polyurethanes is carried out by reacting 1 mol of a diisocyanate with two mol of an amino diol to form the zeroth generation of the dendritic polyurethane. The temperature in the reaction should be as low as possible, preferably in the range from −10 to 30° C. The urethane formation reaction is virtually completely suppressed in this temperature range and the NCO groups of the isocyanate react exclusively with the amino group of the amino diol. In the next reaction step, the free hydroxyl groups of the amino diol which has been added on react selectively at elevated temperature, preferably in the range from 30 to 80° C., with the more reactive NCO group of the isocyanate added. The resulting dendritic polyurethane of the first generation has as functional end groups the less reactive NCO groups of the isocyanate added. These are in turn reacted, as in the preparation of the zeroth generation of the dendritic polyurethane, at low temperature with the amino diol, and so forth. The reaction can be carried out in bulk or in solvents or in the presence of a urethane-formation catalyst. Between the reaction steps, removal of excess monomers and/or a purification step can be carried out if necessary.

In this way it is possible to produce dendritic polyurethanes which double their functionality in each generation.

Three- and higher-functional isocyanates and compounds having four or more functional groups which are reactive toward isocyanates can also be reacted in an analogous manner.

To prepare the highly branched polyurethanes, the preferred procedure is to initially react one mol of a diisocyanate with one mol of a compound containing at least two groups which are reactive toward isocyanate groups and have differing reactivity, preferably an amino diol as described above, to form a compound which contains both free isocyanate groups and free isocyanate-reactive groups, preferably hydroxyl groups. Heating and/or addition of catalyst enables this molecule to react intermolecularly to give a highly branched polyurethane. The reaction can, if necessary, be terminated by addition of a monofunctional compound or by further addition of one of the two reactants. However, the reaction can also be continued until the initiator molecule has reacted completely to give very high molecular weight structures.

In a further preferred embodiment of the process of the invention, the preparation of the highly branched polyurethanes can also be carried out by first allowing one mol of diisocyanate to react with two mol of dialkanolamine and then adding one mol of diisocyanate having NCO groups of differing reactivity to this reaction product, namely a tetrafunctional compound having uniform reactivity. This reaction likewise gives a highly branched polyurethane.

If necessary, the functional groups of the dendritic or highly branched polyurethanes can be modified or made inert. Thus, NCO-terminated polymers can be reacted completely or partially with, for example, fatty alcohols, fatty amines or monoalcohols containing acrylate groups, e.g. hydroxyethyl acrylate or hydroxyethyl methacrylate. Hydroxyl-terminated polymers can, for example, be made inert by reaction with monocarboxylic acids, for example fatty acids, or monoisocyanates and/or be functionalized by means of acrylic acids. The addition of alkylene oxides such as ethylene oxide, propylene oxide and/or butylene oxide enables the chains to be extended.

Water-soluble dendritic or highly branched structures can also be obtained by addition of ionic compounds onto the NCO groups or onto the groups which are reactive toward NCO groups. The reaction can in each case be carried out in the absence of solvents, but is preferably carried out in solution. Suitable solvents are all compounds which are liquid at the reaction temperature and are inert toward the monomers and the end products.

The dendritic and highly branched polyurethanes of the invention are used, for example, as crosslinkers for polyurethane systems or as building blocks for other polyaddition or polycondensation polymers. Further possible uses are as phase compatibilizers, rheological auxiliaries, thixotropes, nucleating agents or as catalyst supports or carriers for active compounds.

The process of the present invention makes it possible to prepare dendritic and highly branched polyurethanes from readily available polyurethane raw materials in a simple way, in particular without the cumbersome introduction of protective groups.

The process of the present invention is illustrated by the following examples.

EXAMPLE 1

Preparation of a Dendritic Polyurethane

1a) Preparation of the NCO-functional initiator molecule 1 mol of 2,4-TDI was dissolved in 500 ml of dried toluene. At a temperature of 20° C., 0.33 mol of hexanediol dissolved in 50 ml of dried tetrahydrofuran (THF) was added dropwise over a period of one hour. After the addition was complete, the reaction mixture was allowed to react further for one hour. The solid formed was filtered off with suction, washed with toluene and dried under reduced pressure. The reaction product had an NCO functionality of 2 and had the following parameters:

| Yield: | 80% |
| Melting point: | 134° C. |
| NCO content: | 18.0% by weight |
| Molar mass: | 466.5 g/mol |

1b) Preparation of the first generation of the dendritic polyurethane (hydroxyl-functional) 0.2 mol of diethanolamine and. 200 ml of dry THF were placed in a reaction vessel. At 20° C., 0.1 mol of the initiator. molecule from Example 1a, dissolved in 400 ml of dry THF, was added dropwise over a period of one hour. After addition was complete, the mixture was stirred for another three hours and was then allowed to stand overnight. The white solid formed was filtered off with suction, washed with THF and dried at 80° C. under reduced pressure. The reaction product had a hydroxyl functionality of 4 and had the following parameters:

| Yield: | 70% |
| Melting point: | 155° C. |
| Molar mass: | 678.8 g/mol |

1c) Preparation of the first generation of the dendritic polyurethane (NCO-functional)

0.4 mol of 2,4-TDI and 100 ml of dry N-methylpyrrolidone (NMP) were placed in a reaction vessel and, at 20° C., 0.1 mol of the product from Example 1b), dissolved in 500 ml of THF, was added over a period of 30 minutes. The reaction mixture was stirred until a clear solution had been obtained and the THF was then removed on a rotary evaporator. The NMP-containing residue was taken up in 100 ml of diethyl ether, triturated and the solid formed was again washed with 100 ml of diethyl ether. It was subsequently dried under reduced pressure at 80° C. The reaction product had an NCO functionality of 4 and had the following parameters:

| Yield: | 95% |
| Softening point: | 57° C. |
| NCO content: | 12.2% by weight |
| Molar mass: | 1373.4 g/mol |

1d) Preparation of the second generation of the dendritic polyurethane (hydroxyl-functional)

0.4 mol of diethanolamine and 300 ml of dry THF were placed in a reaction vessel and, at 20° C., 0.1 mol of the product from Example 1c), dissolved in 600 ml of THF, was added dropwise over a period of one hour. The reaction product precipitated immediately. The reaction mixture was stirred further for one hour and the supernatant THF was decanted off. The remaining product was boiled with 500 ml of hot THF and the supernatant solution was discarded. The resulting product was processed further without purification. The molar mass of the product formed was 1794 g/mol and it had an OH functionality of 8. The yield was 95%.

1e) Preparation of the second generation of the dendritic polyurethane (NCO-functional)

0.8 mol of 2,4-TDI, dissolved in 150 ml of THF was placed in a reaction vessel and, at 20° C., 0.5 mol of the product from Example 1d), dissolved in 50 ml of NMP, was added dropwise over a period of one hour. The mixture was allowed to react further for 3 hours at 20° C. and the THF was then taken off under reduced pressure on a rotary evaporator. The NMP-containing residue was admixed with 200 ml of diethyl ether, triturated and the supernatant solution was decanted off. This procedure was subsequently repeated using 200 ml of hot toluene, the solid was filtered off with suction and was dried at 80° C. under reduced pressure. The reaction product had an NCO functionality of 8 and had the following parameters:

| Yield: | 78% |
| Softening point: | 75° C. |
| NCO content: | 10.5% by weight |
| Molar mass: | 3187.3 g/mol |

EXAMPLE 2

Preparation of a Highly Branched Polyurethane (hydroxyl-functional)

One mol of IPDI was dissolved in 300 ml of dry THF and cooled to 10° C. Subsequently, at this temperature, 1 mol of diethanolamine dissolved in 100 ml of THF was added over a period of 30 minutes. After the addition was complete, the reaction mixture was stirred for 30 minutes at 10° C., then heated to 65° C. and 100 ppm of dibutyltin dilaurate were added. The mixture was stirred at 65° C. until, after about 90 minutes, turbidity caused by the polymer formed became visible. The reaction was then stopped by addition of 0.1 mol of diethanolamine dissolved in THF. After removal of the solvent, the resulting highly branched polyurethane had the following parameters:

Hydroxyl number: 250 mg KOH/g GPC analysis (PMMA calibration) Molecular weight $M_w$: 258000 Molecular weight $M_n$: 5600

EXAMPLE 3

Preparation of a Highly Branched Polyurethane (hydroxyl-functional)

1 mol of diethanolamine was dissolved in 300 ml of dry THF and cooled to 10° C. Subsequently, at this temperature, 1 mol of IPDI dissolved in 100 ml of THF was added over a period of 30 minutes. Immediately after the commencement of the addition, the solution became turbid and a suspension was formed. After the addition was complete, the reaction mixture was stirred for 30 minutes at 10° C., then heated to 65° C. and 100 ppm of dibutyltin dilaurate were added. The solution subsequently became clear. The solution was stirred at 65° C. until, after about 90 minutes, turbidity caused by the polymer formed became visible. The reaction was stopped by addition of 0.1 mol of diethanolamine dissolved in THF. After removal of the solvent, the highly branched polyurethane formed had the following parameters:

Hydroxyl number: 280 mg KOH/g GPC analysis (PMMA calibration) Molecular weight $M_w$: 147000 Molecular weight $M_n$: 5300

EXAMPLE 4

Preparation of a Highly Branched polyurethane (hydroxyl-functional)

1 mol of 2,4-TDI was dissolved in 300 ml of dry THF and cooled to 0° C. Subsequently, at this temperature, 1 mol of ethanolpropanolamine dissolved in 100 ml of THF was added over a period of 30 minutes. After the addition was complete, the reaction mixture was warmed to 23° C. and stirred at this temperature for 30 minutes. The reaction was then stopped by addition of 0.1 mol of ethanolpropanolamine dissolved in THF. After removal of the solvent, the highly branched polyurethane formed had the following parameters:

Hydroxyl number: 290 mg KOH/g GPC analysis (PMMA calibration) Molecular weight $M_w$: 8600 Molecular weight $M_n$: 3600

EXAMPLE 5

Preparation of a Highly Branched Polyurethane (NCO-functional)

1 mol of glycerol was dissolved in 300 ml of dry DMF and the solution was cooled to −10° C. Subsequently, at this temperature, 2 mol of 2,4-TDI dissolved in 300 ml of DMF were added over a period of 30 minutes. After the addition was complete, the reaction mixture was warmed to 23° C. and stirred at this temperature for 60 minutes. The reaction was then stopped by addition of 0.1 mol of 2,4-TDI dissolved in DMF. After removal of the solvent, the highly branched polyurethane formed had the following parameters:

NCO content: 13.4% by weight GPC analysis (PMMA calibration) Molecular weight $M_w$: 7300 Molecular weight $M_n$: 2600

We claim:

1. A process for preparing dendritic or highly branched polyurethanes by reacting diisocyanates and/or polyisocyanates with compounds containing at least two groups which are reactive toward isocyanates, wherein at least one of the reactants contains functional groups having a different reactivity compared to the other reactant and the reaction conditions are selected so that only certain reactive groups react with one another in each reaction step.

2. A process for preparing dendritic polyurethanes as claimed in claim 1, which comprises adding a molecule containing at least two groups which are reactive toward isocyanate groups or containing at least two isocyanate groups of differing reactivity onto each of the functional groups of a polyfunctional molecule containing at least two isocyanate groups or containing at least two groups which are reactive toward isocyanate groups, then adding a molecule containing at least two groups which are reactive toward the free reactive groups and have differing reactivity onto the free reactive groups of the resulting molecule, and so forth until the desired molar mass has been reached or a further addition reaction is no longer possible for stearic reasons.

3. A process for preparing dendritic or highly branched polyurethanes as claimed in claim 1, wherein the isocyanates having at least two isocyanate groups are selected from the group consisting of tolylene 2,4-diisocyanate, tolylene 2,6-diisocyanate, diphenylmethane 2,4-diisocyanate, triisocyanatotoluene, phenylene 1,3- and 1,4-diisocyanate, naphthylene 1,5-diisocyanate, tolidine diisocyanate, biphenyl diisocyanate, isophorone diisocyanate, 2-butyl-2-ethylpentamethylene diisocyanate, 2-isocyanatopropylcyclohexyl isocyanate, 4-methylcyclohexyl 1,3-diisocyanate, dicyclohexylmethane 2,41-diisocyanate and mixtures thereof.

4. A process for preparing dendritic or highly branched polyurethanes as claimed in claim 1, wherein the compounds having at least two groups which are reactive toward isocyanate groups are compounds having at least one primary and at least one secondary hydroxyl group or at least one hydroxyl group and at least one mercapto group or at least one hydroxyl group and at least one amino group in the molecule.

5. A process for preparing highly branched polyurethanes as claimed in claim 1, which comprises reacting one mole of an isocyanate with one mole of a compound containing at least two groups which are reactive toward isocyanate groups and have differing reactivity and reacting the resulting compound which contains both free isocyanate groups and free groups which are reactive toward isocyanate groups intermolecularly to form a highly branched polyurethane.

6. A process for preparing highly branched polyurethanes as claimed in claim 1, which comprises reacting one mole of a diisocyanate with one mole of a tetrafunctional compound which is reactive toward isocyanates and reacting the resulting compound which contains both free isocyanate groups and free groups which are reactive toward isocyanate groups intermolecularly to form a highly branched polyurethane.

7. A process for preparing highly branched polyurethanes as claimed in claim 1, which comprises reacting two mole of a diisocyanate with one mole of a trifunctional compound containing groups which are reactive toward isocyanate groups and have differing reactivity and reacting the resulting compound which contains both free isocyanate groups and free groups which are reactive toward isocyanate groups intermolecularly to form a highly branched polyurethane.

* * * * *